US012795509B2

(12) United States Patent
Ozturk et al.

(10) Patent No.: US 12,795,509 B2

(45) Date of Patent: Nov. 10, 2026

(54) USER EQUIPMENT REPORTING OF UNIFIED ACCESS CONTROL MEASUREMENTS

(71) Applicant: QUALCOMM Incorporated, San Diego, CA (US)

(72) Inventors: Ozcan Ozturk, San Diego, CA (US); Huichun Liu, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 17/787,003

(22) PCT Filed: Dec. 19, 2019

(86) PCT No.: PCT/CN2019/126584

§ 371 (c)(1), (2) Date: Jun. 17, 2022

(87) PCT Pub. No.: WO2021/120097

PCT Pub. Date: Jun. 24, 2021

(65) Prior Publication Data

US 2023/0092358 A1 Mar. 23, 2023

(51) Int. Cl.

*H04W 48/08* (2009.01)
*H04W 24/02* (2009.01)

(Continued)

(52) U.S. Cl.

CPC ........... *H04W 48/08* (2013.01); *H04W 24/02* (2013.01); *H04W 24/10* (2013.01); *H04W 48/02* (2013.01); *H04W 24/08* (2013.01)

(58) Field of Classification Search

CPC ..... H04W 48/08; H04W 24/02; H04W 24/10; H04W 48/02; H04W 24/08

See application file for complete search history.

(56) References Cited

U.S. PATENT DOCUMENTS

| | | | | |
|---|---|---|---|---|
| RE49,136 E * | 7/2022 | Jang | .................. | H04W 74/0833 |
| 11,570,647 B2 * | 1/2023 | Zhang | .................. | H04W 76/19 |

(Continued)

FOREIGN PATENT DOCUMENTS

| | | |
|---|---|---|
| CN | 101925106 A | 12/2010 |
| CN | 102835146 A | 12/2012 |

(Continued)

OTHER PUBLICATIONS

Belleschi et al.—U.S. Appl. No. 62/804,791 for US Patent Publication 2022/0078873 (Year: 2019).*

(Continued)

*Primary Examiner* — Angela Widhalm de Rodriguez

(74) *Attorney, Agent, or Firm* — Loza & Loza, LLP/QUALCOMM Incorporated

(57) ABSTRACT

Aspects of the disclosure relate to a user equipment (UE) reporting unified access control (UAC) measurements to a network. In an example operation, the UE receives a configuration from the network indicating one or more measurements (e.g., UAC measurements) to record. Thereafter, the UE performs an attempt to access the network and records the one or more measurements associated with the attempt. The UE then reports, to the network, an availability of the one or more measurements after the attempt is performed. The UE may then receive from the network a request for at least one measurement of the one or more measurements. If so, the UE reports the at least one measurement to the network. Other aspects and features are also claimed and described.

35 Claims, 11 Drawing Sheets

(51) Int. Cl.
*H04W 24/10* (2009.01)
*H04W 48/02* (2009.01)
*H04W 24/08* (2009.01)

(56) References Cited

U.S. PATENT DOCUMENTS

| | | | | |
|---|---|---|---|---|
| 12,336,030 | B2 * | 6/2025 | Kim | H04W 76/15 |
| 2005/0251363 | A1 | 11/2005 | Turner et al. | |
| 2010/0173633 | A1 * | 7/2010 | Catovic | H04W 36/0094 455/436 |
| 2013/0242898 | A1 * | 9/2013 | Johansson | H04W 24/02 370/329 |
| 2013/0315075 | A1 * | 11/2013 | Tamura | H04L 43/0823 370/242 |
| 2014/0241285 | A1 | 8/2014 | Pang et al. | |
| 2014/0269574 | A1 * | 9/2014 | Kim | H04W 72/542 370/329 |
| 2014/0301239 | A1 * | 10/2014 | Fukuta | H04W 24/10 370/252 |
| 2015/0029949 | A1 | 1/2015 | Tsai et al. | |
| 2015/0126205 | A1 * | 5/2015 | Kim | H04W 74/002 455/450 |
| 2015/0249951 | A1 * | 9/2015 | Jung | H04W 8/186 455/435.1 |
| 2019/0357119 | A1 * | 11/2019 | Hong | H04L 1/1614 |
| 2022/0078873 | A1 * | 3/2022 | Belleschi | H04W 28/24 |

FOREIGN PATENT DOCUMENTS

| | | | | | |
|---|---|---|---|---|---|
| CN | 102948201 | A | | 2/2013 | |
| CN | 103096355 | A | | 5/2013 | |
| CN | 103119867 | A | | 5/2013 | |
| CN | 104798396 | A | | 7/2015 | |
| CN | 106031248 | A | | 10/2016 | |
| CN | 109474949 | A | | 3/2019 | |
| EP | 3214872 | A1 | * | 9/2017 | H04W 48/16 |
| WO | WO-2020051588 | A1 | * | 3/2020 | H04W 24/00 |

OTHER PUBLICATIONS

G. Katsikogiannis, S. Mitropoulos and C. Douligeris, "UACS: Towards unified access control services," 2015 IEEE International Symposium on Signal Processing and Information Technology (ISSPIT), Abu Dhabi, United Arab Emirates, 2015, pp. 127-132, doi: 10.1109/ISSPIT.2015.7394314. (Year: 2015).*

Ericsson: "On the Use Cases and Required F1 Signaling for BACH Optimization at NB-DU", 3GPP TSG RAN WG3 #105bis, R3-196026, 3rd Generation Partnership Project, Mobile Competence Centre, 650, Route Des Lucioles, F-06921 Sophia-Antipolis Cedex, France, vol. RAN WG3, No. Chongqing, CN, Oct. 14, 2019-Oct. 18, 2019, Oct. 5, 2019, pp. 1-5, XP051793037, clause 2 with reference to Fig. 5.

Ericsson: "Open Issues Related to BACH Report", 3GPP TSG-RAN WG2 #108, R2-1915433, 3rd Generation Partnership Project (3GPP), Mobile Competence Centre, 650, Route Des Lucioles, F-06921 Sophia-Antipolis Cedex, France, vol. RAN WG2, No. Reno, US, Oct. 18, 2019-Nov. 22, 2019, Nov. 7, 2019, 10 Pages, XP051815910, clause 2 with reference to Fig. 1.

Nokia, et al., "On the RACH Report and its Reporting Procedure", 3GPP TSG-RAN WG2 Meeting #108, R2-1915619, 3rd Generation Partnership Project, Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 8, 2019, 3 Pages, XP051817287, clauses 1 to 5.

Samsung: "Further Logged Information in NR MDT", 3GPP TSG-RAN WG2 Meeting #108, R2-1916095, 3rd Generation Partnership Project, Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 8, 2019, pp. 1-7, XP051817644, Clause 2.4.2 with reference to Fig. 3.

Supplementary European Search Report—EP19956727—Search Authority—Munich—Jul. 27, 2023.

International Search Report and Written Opinion—PCT/CN2019/126584—ISAEPO—Sep. 10, 2020.

3GPP: "3rd Generation Partnership Project; Technical Specification Group Radio Access Network; Evolved Universal Terrestrial Radio Access (E-UTRA); Radio Resource Control (RRC); Protocol Specification (Release 15)", 3GPP TS 36.331 V15.7.0, Sep. 2019, pp. 1-962, section 5.3.16, section 5.6.5-5.6.8.

3GPP: "3rd Generation Partnership Project; Technical Specification Group Radio Access Network; NR; Radio Resource Control (RRC) Protocol Specification (Release 15)", 3GPP TS 38.331 V15.7.0, Sep. 2019, pp. 1-527, section 5.3.14.

* cited by examiner

USER EQUIPMENT REPORTING OF UNIFIED ACCESS CONTROL MEASUREMENTS

CROSS-REFERENCE TO RELATED APPLICATION

This application is a 371 national stage application of PCT patent application serial no. PCT/CN2019/126584, filed in the China Intellectual Property Office on Dec. 19, 2019, the entire content of which is incorporated herein by reference as if fully set forth below in its entirety and for all applicable purposes.

INTRODUCTION

The technology discussed below relates generally to wireless communication systems, and more particularly, to communicating control measurements related to a network access attempt.

In a 3rd Generation Partnership Project (3GPP) New Radio (NR) Release 16 specification (3GPP Rel-16 NR), different types of user equipment (UE) reporting for measurements and events were described as part of a Self Organizing Network (SON) and Minimization of Drive Tests (MDT). In a 3GPP NR Release 17 specification (3GPP Rel-17 NR), UE reporting of measurements and events may extend to other scenarios. One example scenario is directed to Unified Access Control (UAC), which was specifically introduced for 5G (NR and eLTE) in a 3GPP NR Release 15 specification.

As the demand for mobile broadband access continues to increase, research and development continue to advance wireless communication technologies not only to meet the growing demand for mobile broadband access, but to advance and enhance the user experience with mobile communications. Accordingly, the present disclosure addresses procedures, content, and triggers for UE reporting of UAC-related events.

BRIEF SUMMARY

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure relate to reporting control measurements (e.g., unified access control (UAC) measurements) from a UE to a network.

In one example, a method for wireless communication at a user equipment (UE) is disclosed. The method includes receiving a configuration from a network indicating one or more measurements to record, performing an attempt to access the network, recording the one or more measurements associated with the attempt, reporting, to the network, an availability of the one or more measurements after the attempt is performed, receiving a request for at least one measurement of the one or more measurements from the network, and reporting the at least one measurement to the network if the request for the at least one measurement is received from the network.

In another example, a user equipment (UE) for wireless communication is disclosed. The UE includes at least one processor and a memory coupled to the at least one processor. The at least one processor and the memory are configured to receive a configuration from a network indicating one or more measurements to record, perform an attempt to access the network, record the one or more measurements associated with the attempt, report, to the network, an availability of the one or more measurements after the attempt is performed, receive a request for at least one measurement of the one or more measurements from the network, and report the at least one measurement to the network if the request for the at least one measurement is received from the network.

In a further example, a user equipment (UE) for wireless communication is disclosed. The UE includes means for receiving a configuration from a network indicating one or more measurements to record, means for performing an attempt to access the network, means for recording the one or more measurements associated with the attempt, means for reporting, to the network, an availability of the one or more measurements after the attempt is performed, means for receiving a request for at least one measurement of the one or more measurements from the network, and means for reporting the at least one measurement to the network if the request for the at least one measurement is received from the network.

In yet another example, a non-transitory computer-readable medium storing computer-executable code at a user equipment (UE), comprising code is disclosed. The code causes a computer to receive a configuration from a network indicating one or more measurements to record, perform an attempt to access the network, record the one or more measurements associated with the attempt, report, to the network, an availability of the one or more measurements after the attempt is performed, receive a request for at least one measurement of the one or more measurements from the network, and report the at least one measurement to the network if the request for the at least one measurement is received from the network.

In an example, a method for wireless communication at a network device is disclosed. The method includes sending a configuration to a UE indicating one or more measurements to record, receiving, from the UE, a report indicating an availability of the one or more measurements recorded by the UE in association with an attempt to access the network device, determining to receive at least one measurement of the one or more measurements, sending, to the UE, a request to receive the at least one measurement, and receiving, from the UE, a report including the at least one measurement in response to the request.

In another example, a network device for wireless communication is disclosed. The network device includes at least one processor and a memory coupled to the at least one processor. The at least one processor and the memory are configured to send a configuration to a UE indicating one or more measurements to record, receive, from the UE, a report indicating an availability of the one or more measurements recorded by the UE in association with an attempt to access the network device, determine to receive at least one measurement of the one or more measurements, send, to the UE, a request to receive the at least one measurement, and receive, from the UE, a report including the at least one measurement in response to the request.

In a further example, a network device for wireless communication is disclosed. The network device includes means for sending a configuration to a UE indicating one or more more measurements to record, means for receiving, from the UE, a report indicating an availability of the one or more measurements recorded by the UE in association with an attempt to access the network device, means for determining to receive at least one measurement of the one or more measurements, means for sending, to the UE, a request to receive the at least one measurement, and means for receiving, from the UE, a report including the at least one measurement in response to the request.

In yet another example, a non-transitory computer-readable medium storing computer-executable code at a network device, comprising code is disclosed. The code causes a computer to send a configuration to a UE indicating one or more measurements to record, receive, from the UE, a report indicating an availability of the one or more measurements recorded by the UE in association with an attempt to access the network device, determine to receive at least one measurement of the one or more measurements, send, to the UE, a request to receive the at least one measurement, and receive, from the UE, a report including the at least one measurement in response to the request.

These and other aspects of the disclosure will become more fully understood upon a review of the detailed description, which follows. Other aspects and features will become apparent to those of ordinary skill in the art, upon reviewing the following description of specific, exemplary aspects of the present disclosure in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as a device, system, or method, it should be understood that such exemplary aspects can be implemented in various devices, systems, and methods.

DETAILED DESCRIPTION

Figure 1:
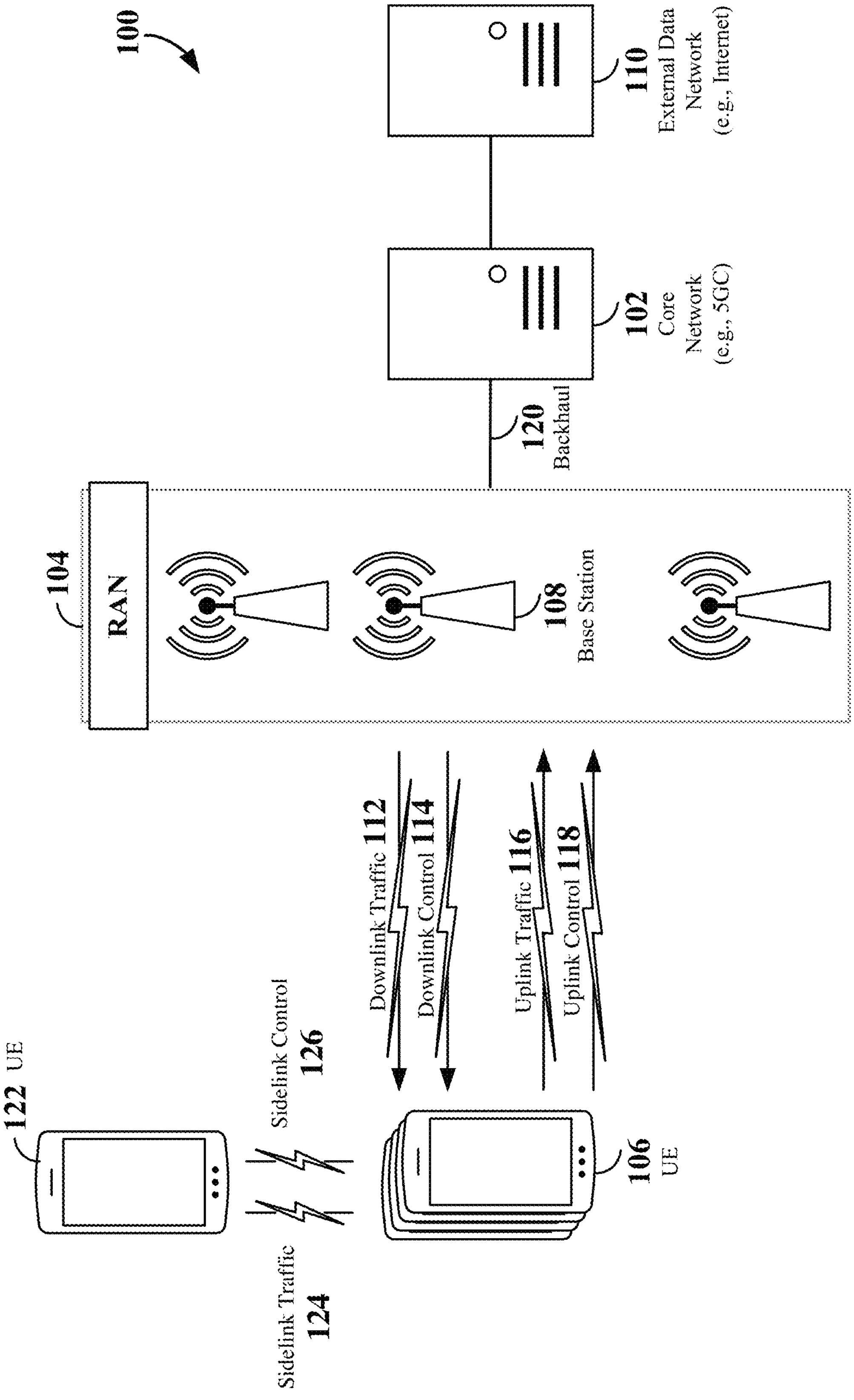
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects are described in this application by illustration to some examples, those skilled in the art will understand that additional implementations and use cases may come about in many different arrangements and scenarios. Aspects described herein may be implemented across in any differing platform types, devices, systems, shapes, sizes, packaging arrangements. For example, aspects and/or uses may come about via integrated chip aspects and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or OEM devices or systems incorporating one or more aspects of the disclosure. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, end-user devices, etc. of varying sizes, shapes and constitution.

A Self Organizing Network (SON) refers to mobile network automation and minimization of human intervention in cellular/wireless network management. SON's objectives include: 1) bringing intelligence and autonomous adaptability into cellular networks; 2) reducing capital and operation expenditures; and 3) enhancing network performances in terms of network capacity, coverage, offered service/experience, etc. SON aims at improving spectral efficiency, simplifying management, and reducing the operation costs of next generation radio access networks (RANs).

Drive tests are used for collecting data of mobile networks. This data is needed for the configuration and maintenance of mobile networks, e.g., with respect to network capacity optimization, network coverage optimization, UE mobility optimization, and quality of service (QoS) verification. In order to execute drive tests, human effort is required. However, these measurements cover only a small piece of time and location of the network. Minimization of Drive Tests (MDT) enables operators to utilize UEs to collect radio measurements and associated location information, in order to assess network performance while reducing the operation expenditures associated with traditional drive tests. As such, MDT allows for standard UEs to be used for collecting/recording measurements and reporting the measurements to the operators while traditional drive tests make use of high developed measurement equipment.

In 3GPP Release 16 NR, different types of UE reporting for measurements and events were described with respect to SON and MDT. In 3GPP Release 17 NR, the UE reporting of measurements and events may be directed to other scenarios such as Unified Access Control (UAC), which may enhance a user experience. UAC refers to a mechanism for regulating a UE's access to a network. For example, access control may be exercised by the network to reject the UE access or assign different types of priority to different types of user applications. Accordingly, aspects of the present disclosure relate to procedures, content, and triggers for UE reporting of UAC-related events.

In an aspect, operations related to a UE reporting control measurements (e.g., UAC measurements) to a network will be described. For example, the U E receives a configuration from the network indicating one or more measurements to record. The UE then performs an attempt to access the network and records the one or more measurements associated with the attempt. The UE reports, to the network, an availability of the one or more measurements after the attempt is performed. Thereafter, the UE receives a request for at least one measurement of the one or more measurements from the network and reports the at least one measurement to the network if the request for the at least one measurement is received.

In another aspect, operations related to a network device receiving a report of control measurements (e.g., UAC measurements) from a UE will be described. For example, the network sends a configuration to the UE indicating one or more measurements to record. The network device then receives, from the UE, a report indicating an availability of the one or more measurements recorded by the UE in association with an attempt to access the network device. The network device determines to receive at least one measurement of the one or more measurements, and sends, to the UE, a request to receive the at least one measurement. Thereafter, the network device receives, from the UE, a report including the at least one measurement in response to the request.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the base station/scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a base station 108 may broadcast downlink traffic 112 to one or more UEs 106. Broadly, the base station 108 is a node or device responsible for scheduling traffic in a wireless communication network, including the downlink traffic 112 and, in some examples, uplink traffic 116 from one or more UEs 106 to the base station 108. On the other band, the UE 106 is a node or device that receives downlink control information 114, including but not limited to scheduling information (e.g., a grant), synchronization or timing information, or other control information from another entity in the wireless communication network such as the base station 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5G). In other examples, the core network 102 may be configured according to a 4G evolved packet core (EPC), or any other suitable standard or configuration.

Figure 2:
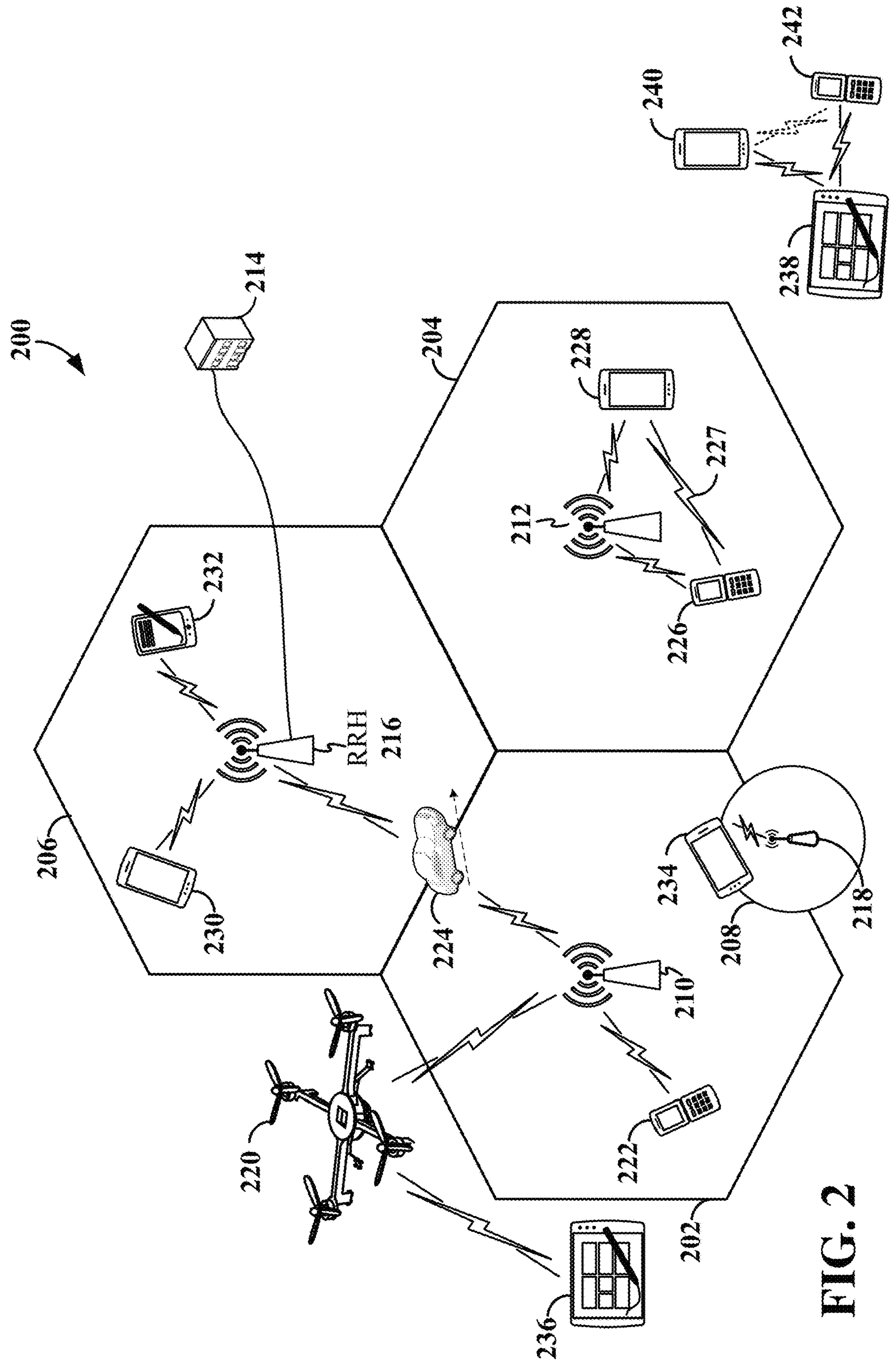
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independence of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE, may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, scheduled entities such as a first UE 106 and a second UE 122 may utilize sidelink signals for direct D2D communication. Sidelink signals may include sidelink traffic 124 and sidelink control 126. Sidelink control information 126 may in some examples include a request signal, such as a request-to-send (RTS), a source transmit signal (STS), and/or a direction selection signal (DSS). The request signal may provide for a UkE 106 to request a duration of time to keep a sidelink channel available for a sidelink signal. Sidelink control information 126 may further include a response signal, such as a clear-to-send (CTS)

and/or a destination receive signal (DRS). The response signal may provide for the UkE 106 to indicate the availability of the sidelink channel, e.g., for a requested duration of dine. An exchange of request and response signals (e.g., handshake) may enable different scheduled entities performing sidelink communications to negotiate the availability of the sidelink channel prior to communication of the sidelink traffic information 124.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
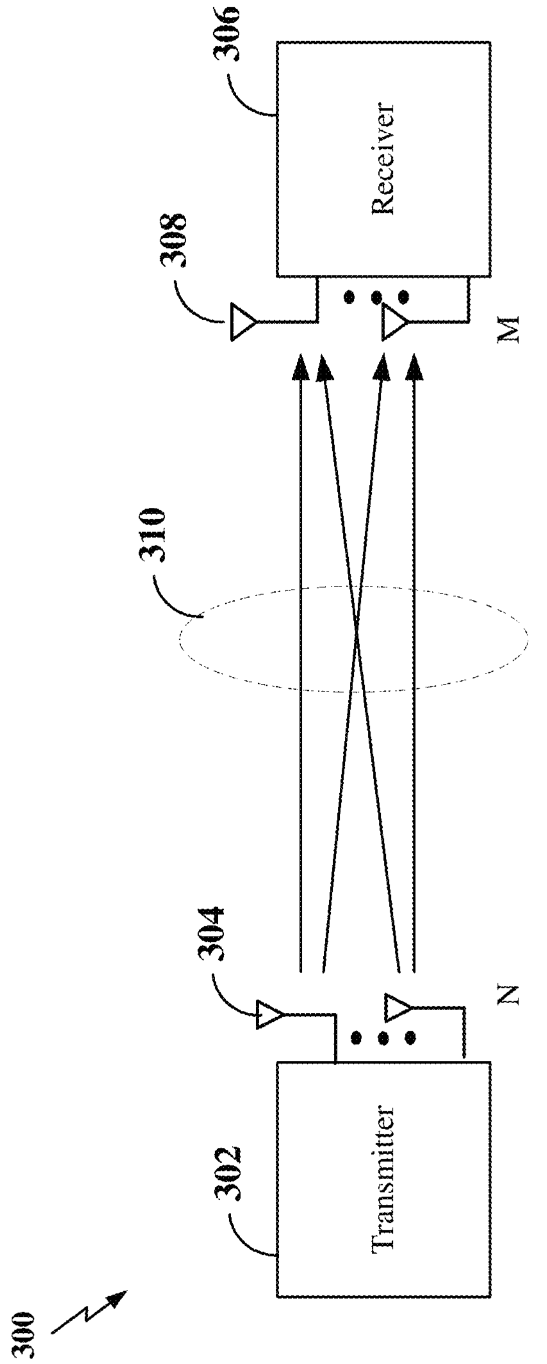
FIG. 3 is a block diagram illustrating a wireless communication system supporting multiple-input multiple-output (MIMO) communication.

In some aspects of the disclosure, the base station/scheduling entity and/or UF/scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a base station/scheduling entity 108, a U/scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downiink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feedback the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of base stations (e.g., scheduling entities) 108 and UEs (e.g., scheduled entities) 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
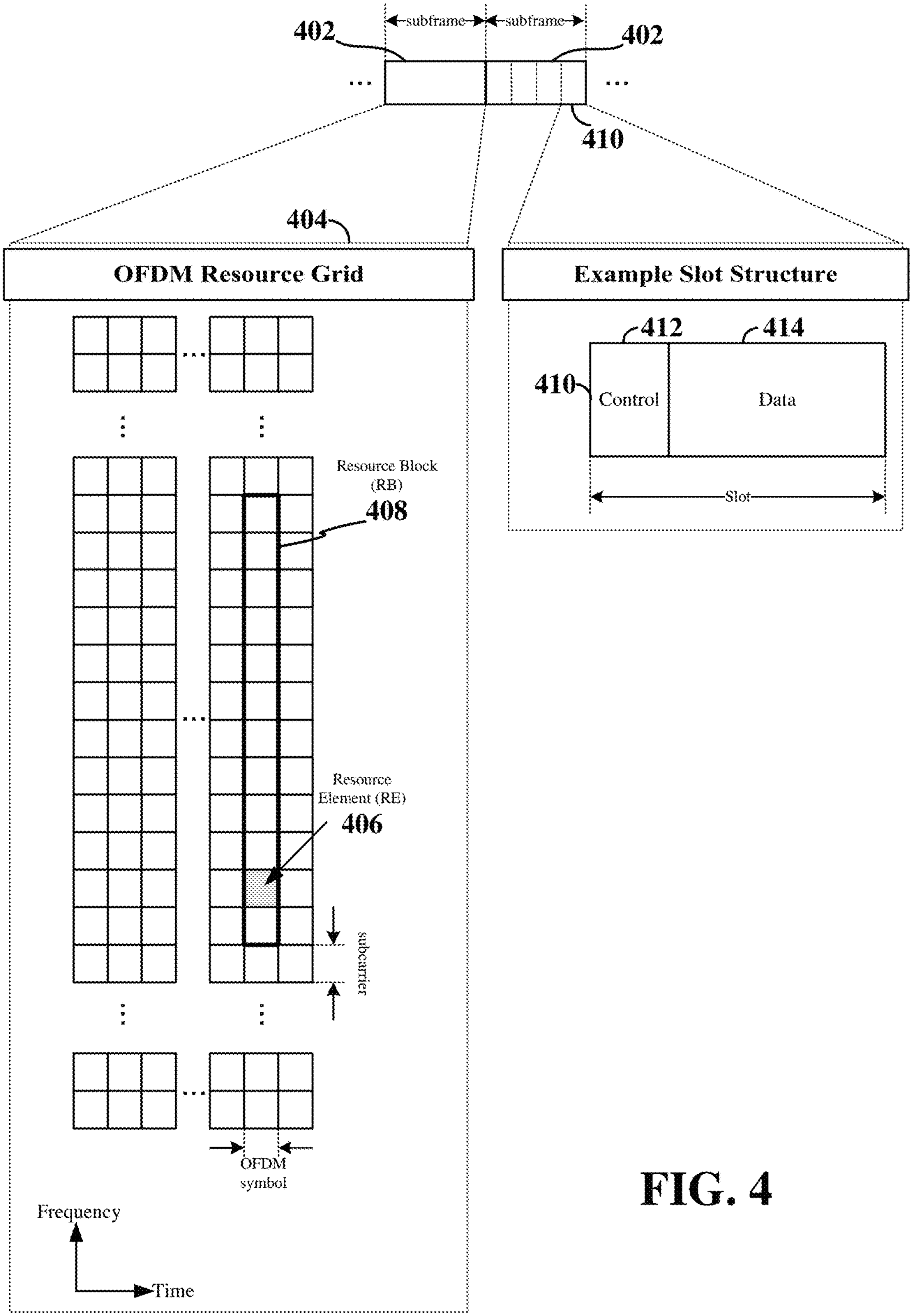
FIG. 4 is a schematic illustration of an organization of wireless resources in an air interface utilizing orthogonal frequency divisional multiplexing (OFDM).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the base station 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more UEs 106. In addition, DL REs may be allocated to carry DL physical signals that generally do not carry information originating from higher layers. These DL physical signals may include a primary synchronization signal (PSS); a secondary synchronization signal (SSS): demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 To 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell, including but not limited to power control commands, scheduling information, a grant, and/or an assignment of REs for DL and UL transmissions.

In an UL transmission, the transmitting device (e.g., the UE 106) may utilize one or more REs 406 to carry UL control information 118 originating from higher layers via one or more UL control channels, such as a physical uplink control channel (PUCCH), a physical random access channel (PRACH), etc., to the base station 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the base station 108 to schedule uplink transmissions. Here, in response to the SR transmitted on the control channel 118, the base station 108 may transmit downlink control information 114 that may schedule resources for uplink packet transmissions. UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MST), and other system information (OSI). The MSI may be periodically broadcast over the cell to provide the most basic information required for initial cell access, and for acquiring any OSI that may be broadcast periodically or sent on-demand. In some examples, the MST may be provided over two different downlink channels. For example, the PBCH may carry a master information block (MID), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 4 are not necessarily all the channels or carriers that may be utilized between a base station 108 and UEs 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (ICS) and the number of RBs in a given transmission.

Figure 5:
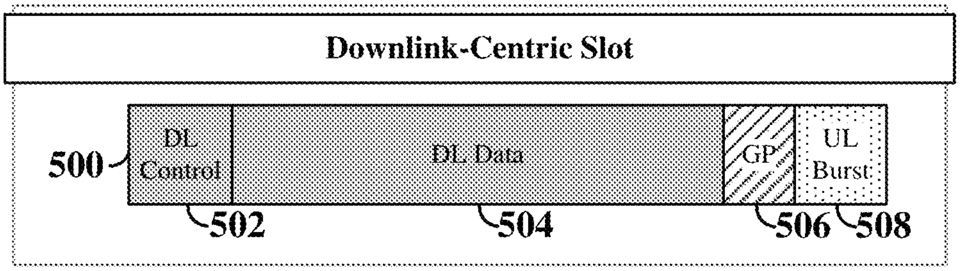
FIG. 5 is a schematic illustration of exemplary self-contained slots according to some aspects of the disclosure.
Figure 5:
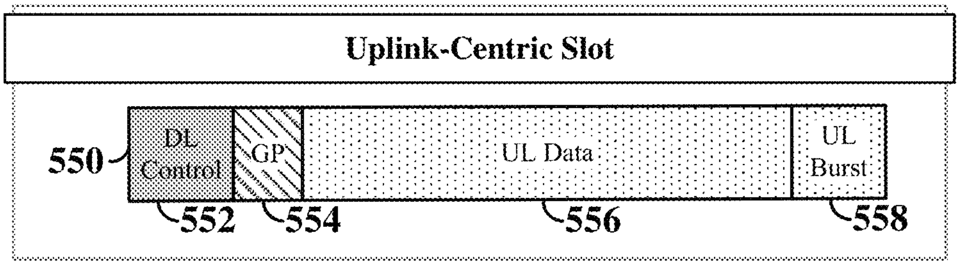

According to an aspect of the disclosure, one or more slots may be structured as self-contained slots. For example, FIG. 5 illustrates two example structures of self-contained slots 500 and 550. The self-contained slots 500 and/or 550 may be used, in some examples, in place of the slot 410 described above and illustrated in FIG. 4.

In the illustrated example, a DL-centric slot 500 may be a transmitter-scheduled slot. The nomenclature DL-centric generally refers to a structure wherein more resources are allocated for transmissions in the DL direction (e.g., transmissions from the base station 108 to the UE 106). Similarly, an UL-centric slot 550 may be a receiver-scheduled slot, wherein more resources are allocated for transmissions in the UL direction (e.g., transmissions from the UE 106 to the base station 108).

Each slot, such as the self-contained slots 500 and 550, may include transmit (Tx) and receive (Rx) portions. For example, in the DL-centric slot 500, the base station 108 first has an opportunity to transmit control information, e.g., on a PDCCH, in a DL control region 502, and then an opportunity to transmit DL user data or traffic, e.g., on a PDSCH in a DL data region 504. Following a guard period (GP) region 506 having a suitable duration, the base station 108 has an opportunity to receive UL data and/or UL, feedback including any UL scheduling requests. CSF, a HARQ ACK/NACK, etc., in an UL burst 508 from other entities using the carrier. Here, a slot such as the DL-centric slot 500 may be referred to as a self-contained slot when all of the data carried in the data region 504 is scheduled in the control region 502 of the same slot; and further, when all of the data carried in the data region 504 is acknowledged (or at least has an opportunity to be acknowledged) in the UL burst 508 of the same slot. In this way, each self-contained slot may be considered a self-contained entity, not necessarily requiring any other slot to complete a scheduling-transmission-acknowledgment cycle for any given packet.

The GP region 506 may be included to accommodate variability in UL and DL timing. For example, latencies due to radio frequency (RF) antenna direction switching (e.g., from DL to UL) and transmission path latencies may cause the UE 106 to transmit early on the UL to match DL timing. Such early transmission may interfere with symbols received from the base station 108. Accordingly, the GP region 506 may allow an amount of time after the DL data region 504 to prevent interference, where the GP region 506 provides an appropriate amount of time for the base station 108 to switch its RF antenna direction, an appropriate amount of time for the over-the-air (OTA) transmission, and an appropriate amount of time for ACK processing by the UE.

Similarly, the UL-centric slot 550 may be configured as a self-contained slot. The UL-centric slot 550 is substantially similar to the DL-centric slot 500, including a guard period 554, an UL data region 556, and an UL burst region 558.

The slot structure illustrated in slots 500 and 550 is merely one example of self-contained slots. Other examples may include a common DL portion at the beginning of every slot, and a common UL portion at the end of every slot, with various differences in the structure of the slot between these respective portions. Other examples still may be provided within the scope of the present disclosure.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 nis subframe). The range of SCS may include any suitable SCS. For example, a scalable numerology may support a SCS ranging from 15 kHz to 480 kHz.

Figure 6:
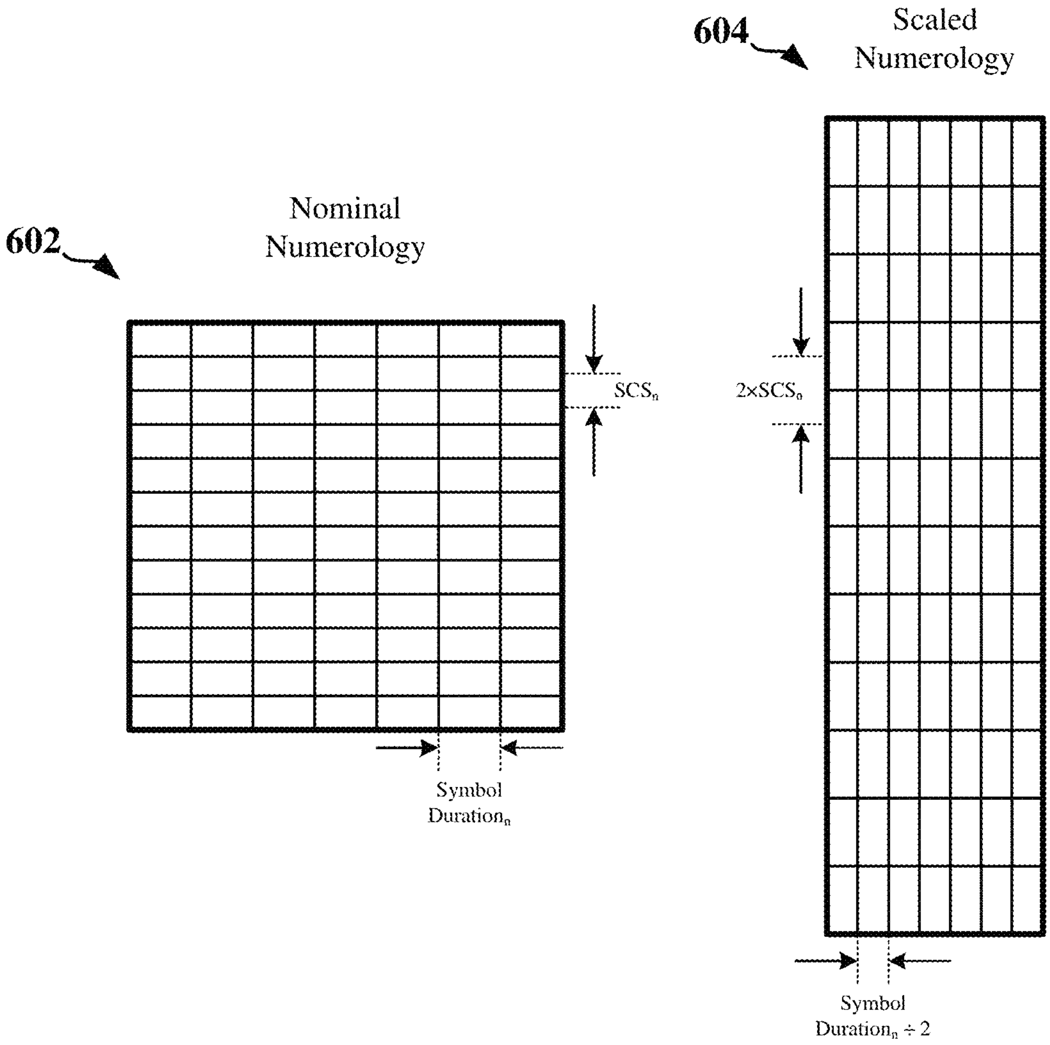
FIG. 6 is a schematic illustration of an OFDM air interface utilizing a scalable numerology according to some aspects of the disclosure.

To illustrate this concept of a scalable numerology, FIG. 6 shows a first RB 602 having a nominal numerology, and a second RB 604 having a scaled numerology. As one example, the first RB 602 may have a 'nominal' subcarrier spacing ($SCS_n$) of 30 kHz, and a 'nominal' symbol $duration_n$ of 333 μs. Here, in the second RB 604, the scaled numerology includes a scaled SCS of double the nominal SCS, or $2\times SCS_n=60$ kHz. Because this provides twice the bandwidth per symbol, it results in a shortened symbol duration to carry the same information. Thus, in the second RB 604, the scaled numerology includes a scaled symbol duration of half the nominal symbol duration, or (symbol $duration_n$)$\div 2=167$ μs.

In 3GPP Release 16 NR, different types of 1J reporting for measurements and events were described with respect to Self Organizing Network (SON) and Minimization of Drive Tests (MDT). In 3GPP Release 17 NR, the UE reporting of measurements and events may be directed to other scenarios such as Unified Access Control (UAC), which may enhance a user experience. Accordingly, aspects of the present disclosure relate to procedures, content, and triggers for UE reporting of UAC-related events.

In general, when a UE initiates an access attempt to a network, access control tray be exercised by the network to regulate the UE's access. For example, the network may reject the UE access or assign different types of priority to different types of user applications. Previously, different types of access control have been established for an LTE system as well as for voice applications. In a current NR system, UAC is established to promote one mechanism for governing access control.

Figure 7:
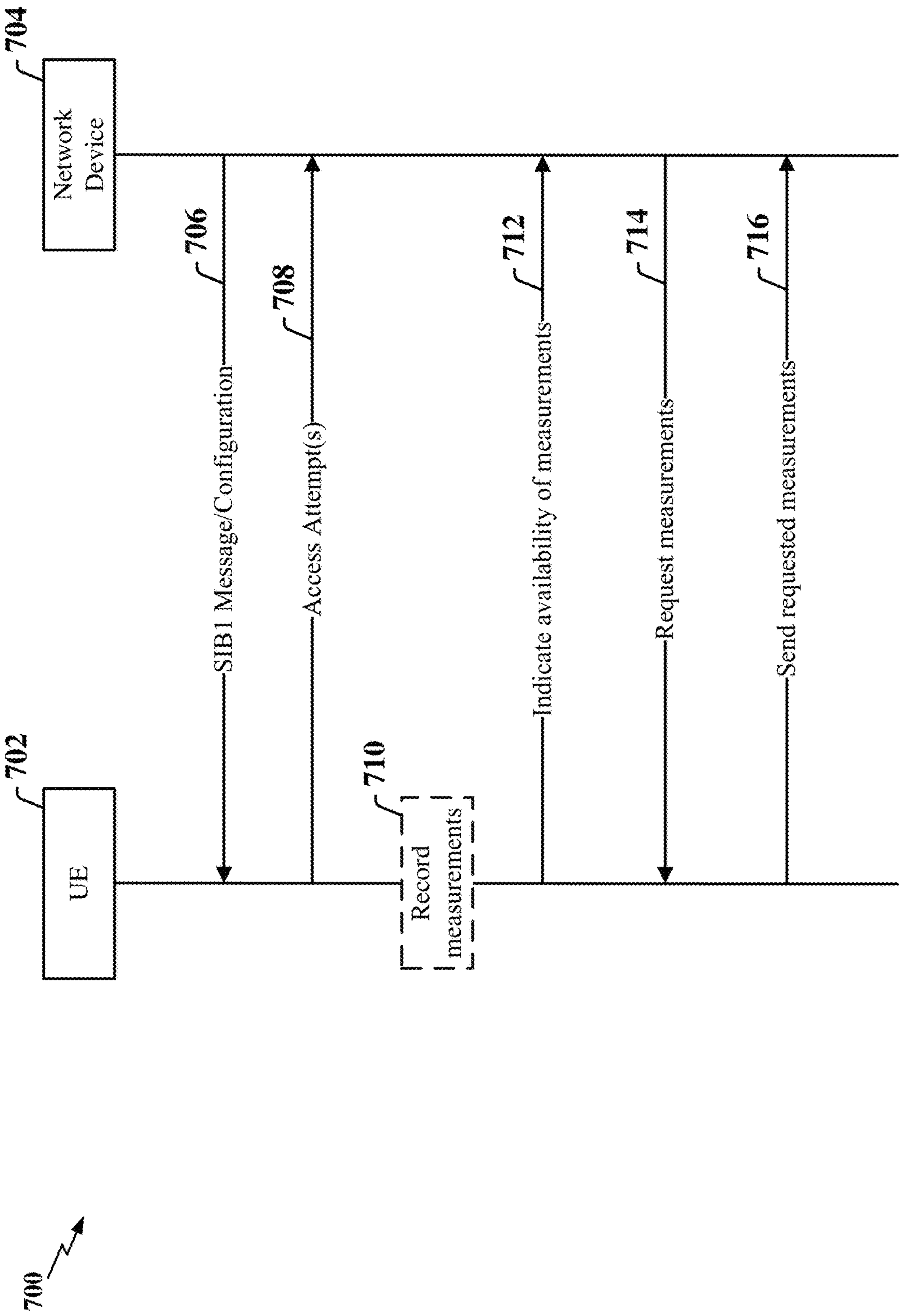
FIG. 7 is a diagram illustrating an example signaling flow for reporting unified access control (UAC)-related measurements from a UE to a network in accordance with some aspects of the present disclosure.

FIG. 7 is a diagram illustrating an example signaling flow 700 for reporting UAC-related measurements from a UE 702 to a network 704 in accordance with some aspects of the present disclosure.

In an example operation, one or more access attempts 708 may be initiated at the UE 702 by upper layers (e.g., non-access stratum (NAS)). The access attempt may also be initiated by a radio resource control (RRC) access stratum (AS), such as when an inactive session is to be resumed. The access attempt can also be initiated while the UE 702 is in a connected state with the network 704, such as when the UE 702 wishes to establish a new PDU session. For each access attempt, the RRC layer of the UE 702 checks whether the access attempt is allowed or not. For example, the UE 702 checks if an access attempt is allowed based on an access category and one or more access identities.

In an aspect, an access category may depend on a type of event the UE is performing. As such, different traffic types may have different access categories. An access category tray be configured at the UE. Numerous access categories may exist including a VOLTE call access category and an operator-determined/configured access category. The operator-determined/configured access category may be configured by upper layers via NAS signaling such as when an operator wishes to assign different priorities to different applications.

In a further aspect, an access identity may be found in a subscriber identity module (SIM) card of the UE or configured by upper layers. The access identity generally indicates a type of the UE, such as a special type of UE (e.g., network operator UE, government UE, emergency services UE, etc.) or a normal UE.

In an aspect, prior to the access attempt, the UE 702 may receive a SIB1 message 706 including a configuration. For each access attempt 708, the UE 702 checks if the access attempt 708 is allowed by comparing the configuration to the access category and access identity associated with the access attempt, and determining if the UE 702 passes the access check based on the comparison. If the UE 702 passes the access check, the UE 702 continues with the access attempt 708. If the UE 702 does not pass the access check, the access attempt 708 is barred. In an aspect, an access timer (e.g., T390 timer) may be associated with the access attempt. Notably, the access attempt 708 is barred (or blocked) by the UE 702 itself based on a network configuration.

In some aspects, an access attempt operation may need special handling. For example, if the UE 702 performed a previous access attempt that was barred, thus triggering a reject timer (e.g., T302 timer) that is still running, then for most access categories, a current access attempt will be barred (or blocked) by the UE 702 unless an emergency call is being performed. In another example, if an access timer (e.g., T390 timer) is running, and the UE 702 performs a cell reselection to a new cell, then a current access attempt is stopped since a different configuration will apply at the new cell.

In an aspect, the UE 702 applies the configuration in the SIB1 message 706 by detecting a number associated with each access category (included in the SIB1 message). The UE 702 will then select a random number. If the UE-selected random number is smaller than the number associated with an access category, the UE 702 will pass the access check and may continue with the access attempt (for the access category). Hence, the access check may be randomized.

In an aspect, a number of UAC-related events may occur during each access attempt. Thus, for each access attempt, the UE 702 may record one or more. UAC-related measurements 710 associated with the events. The network 704 may configure the UE 702 as to what type of measurements to record via the configuration 706. After the access attempt is performed and after the measurements are recorded, the UE 702 may indicate an availability of the measurements 712 to the network 704 the next time the UE 702 is connected to the network 704. If the network 704 is interested in any of the recorded measurements, the network 704 will send a request for at least one of the recorded measurements 712 to the UE 702. In response, the UE 702 will send the requested measurements 716 to the network 704. The network 704 may then utilize the measurements to better optimize wireless communication in a cell (e.g., increase/decrease capacity, provide more/less bandwidth, optimize channels, etc.).

The UAC-related measurements recorded by the UE 702 for each access attempt will be described below. In an aspect, the UE may record the measurements when the UE initiates a connection from an idle or inactive state (e.g., RRC Setup, RRC Resume, (small) Data Transfer) or while in a connected state with the network (NAS triggered transmissions).

The UE may record an access category and one or more access identities used. For each access attempt, such information may be provided by NAS. If the UE is starting a data call, the data call has an access category. For example, the data call may be distinguished according to a type of application used to perform the data call. An access identity may indicate a type of the UE, e.g., a special UE used by firefighters, a UE used by operators, a UE used by government entities, etc. For each access attempt, there may exist one access category and one or more access identities. However, in general, one access category and one access identity may exist per access attempt. In some cases, for a special type of UE, certain operations (e.g., access checks) may be bypassed. For example, in an emergency call, no access check is performed because the emergency call's access to the network is not to be hindered.

The UE may record whether the access attempt is initiated by NAS or RAN. Usually, traffic is generated from upper layers. Thus, if the traffic is generated by NAS, the UE may also record a NAS request type/procedure type, e.g., whether the access attempt is for a new PDU session, a registration attempt, etc. If the traffic is generated from RAN, the UE may record a RAN attempt type, e.g., whether the access attempt is a resume message or a request for on-demand system information (SI). In NR, SI messages can be sent based on a request from the UE.

The UE may record whether the access was barred or not.

The CE may record an elapsed duration of an access timer (T390). The access timer is per access category. If the access timer was running prior to an access attempt, the access attempt is blocked. The UE may further record whether the access timer was running prior to the access attempt.

The UE may record whether a reject timer (T302) was running during the access attempt. Generally, when the CE sends a connection setup request and the network rejects the request, the reject timer indicates to the UE to wait a duration before attempting access again. If the reject timer is running, the UE cannot initiate an access attempt. In an example scenario, upper layers may initiate the access attempt because the upper layers are unaware of the running reject timer. However, the RRC will bar the access attempt based on the reject timer. When the reject timer expires, the bar on attempting access is lifted and the UE may initiate the access attempt again.

The UE may record whether the access timer or the reject timer stopped running due to a cell reselection.

The UE may record UAC-barring information (from SIB1) applied for the access attempt. For example, the UE may record random numbers, which access categories are applicable, etc. In an aspect, although the network may already know this information (since the network configured the cells), the network may still request the information from the UE.

The UE may record a random number used for an access barring check. The UE may further record a cell identifier and/or a radio access technology implemented by the UE (e.g., NR or eLTE).

In an aspect, if the access attempt occurs during an inactive or idle mode, the UE may send a resume or establishment message. Thus, for each attempt, the U E may record a resume or establishment cause for the attempt.

In an aspect, the UE may report the availability of the UAC-related measurements in a RRC setup message or a resume message (e.g., RRC resume complete message).

In an aspect, the UE may report the availability of the UAC-related measurements via a new RRC message or a new indication in an existing RRC message (e.g., UE assistance information) after moving to an RRC connected state.

In an aspect, UAC-related measurements may also be collected/recorded while in the RRC connected state. When in the RRC connected state, an access attempt may be a request for a new PDU session or a request to reconfigure a PDU session (e.g., reconfigure PDU session from one wireless communication system to another wireless communication system). Accordingly, the UTE may report the availability of the UAC-related measurements recorded for each access attempt while in the RRC connected state via a new RRC message or a new indication in an existing RRC message (e.g., UE assistance information).

In an aspect, the UE performing the acts of recording UAC-related measurements and reporting the measurements to the network is voluntary on the part of the UE. The UE's acceptance of the recording/reporting may be performed via upper layer signaling.

In an aspect, the UE may report the UAC-related measurements to gNodeBs of other wireless communication systems. For example, the UE can record UAC-related measurements for NR but fails an access attempt with a NR gNodeB. Accordingly, the UE may connect with a LTE gNodeB and report the recorded UAC-related measurements to the LTE gNodeB.

Figure 8:
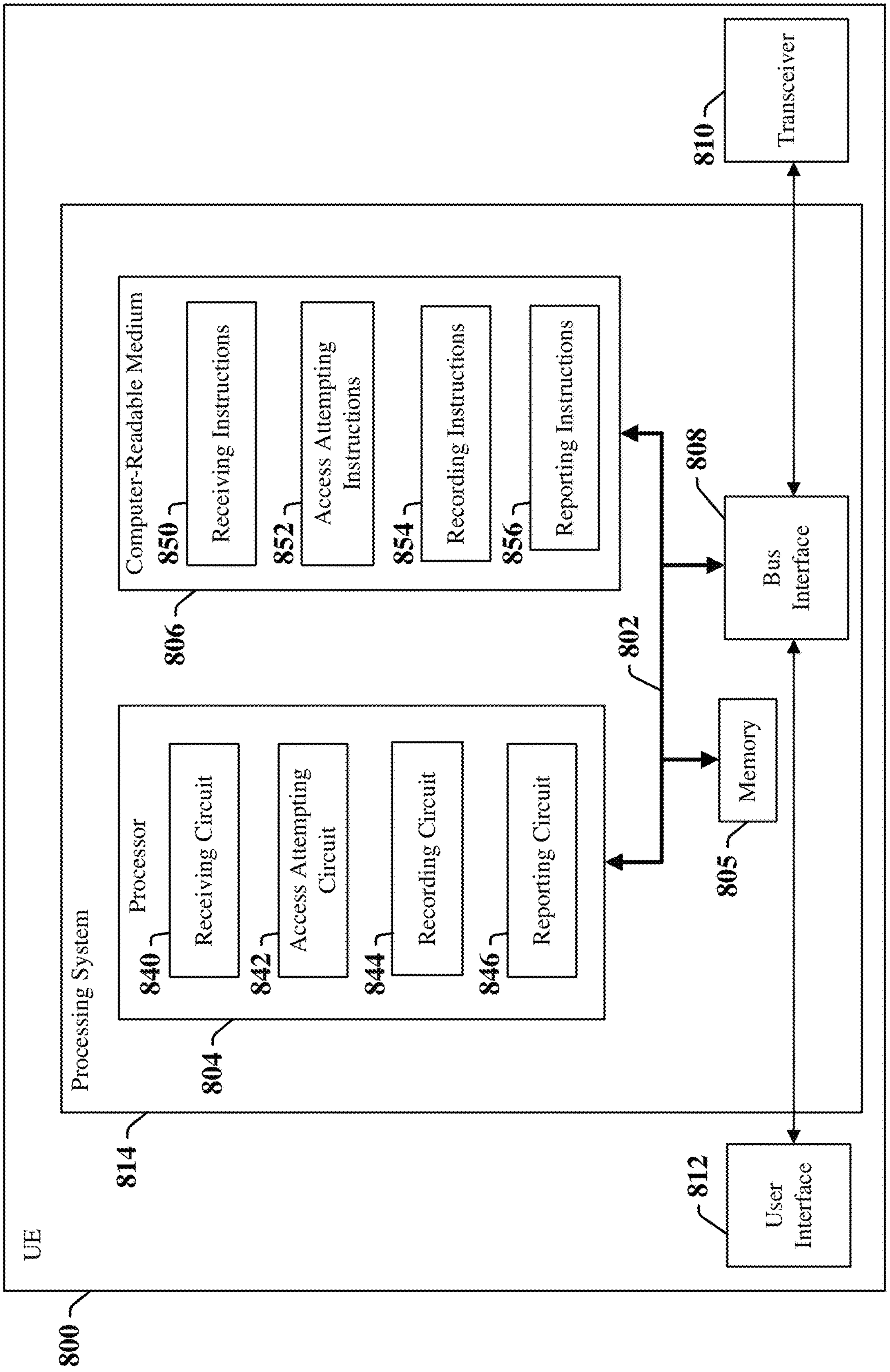
FIG. 8 is a block diagram illustrating an example of a hardware implementation for a UE employing a processing system in accordance with some aspects of the present disclosure.

FIG. 8 is a block diagram illustrating an example of a hardware implementation for a UE 800 employing a processing system 814. For example, the UE 800 may be a user equipment (UE) as illustrated in any one or more of FIGS. 1 and/or 2.

The UE 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 800 may be configured to perform any one or more of the functions described herein. That is, the processor 804, as utilized in the UE 800, may be used to implement any one or more of the processes and procedures described below and illustrated in FIG. 9.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided. Of course, such a user interface 812 is optional, and may be omitted in some examples, such as a base station.

In some aspects of the disclosure, the processor 804 may include receiving circuitry 840 configured for various functions, including, for example, receiving a configuration from a network indicating one or more measurements to record and receiving a request for at least one measurement of the one or more measurements from the network. For example, the receiving circuitry 840 may be configured to implement one or more of the functions described below in relation to FIG. 9, including, e.g., blocks 902 and 910. The processor 804 may also include access attempting circuitry 842 configured for various functions, including, for example, performing an access attempt to the network. For example, the access attempting circuitry 842 may be configured to implement one or more of the functions described below in relation to FIG. 9, including. e.g., block 904. The processor 804 may also include recording circuitry 844 configured for various functions, including, for example, recording the one or more measurements associated with the attempt. For example, the recording circuitry 844 may be configured to implement one or more of the functions described below in relation to FIG. 9, including, e.g., block 906. The processor 804 may also include reporting circuitry 846 configured for various functions, including, for example, reporting, to the network, an availability of the one or more measurements after the attempt is performed and reporting the at least one measurement to the network if the request for the at least one measurement is received from the network. For example, the reporting circuitry 846 may be configured to implement one or more of the functions described below in relation to FIG. 9, including, e.g., blocks 908 and 912.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 806 may include receiving instructions 850 configured for various functions, including, for example, receiving a configuration from a network indicating one or more measurements to record and receiving a request for at least one measurement of the one or more measurements from the network. For example, the receiving instructions 850 may be configured to implement one or more of the functions described below in relation to FIG. 9, including, e.g., blocks 902 and 910. The computer-readable storage medium 806 may also include access attempting instructions 852 configured for various functions, including, for example, performing an access attempt to the network. For example, the access attempting instructions 852 may be configured to implement one or more of the functions described below in relation to FIG. 9, including, e.g., block 904. The computer-readable storage medium 806 may also include recording instructions 854 configured for various functions, including, for example, recording the one or more measurements associated with the attempt. For example, the recording instructions 854 may be configured to implement one or more of the functions described below in relation to FIG. 9, including, e.g., block 906. The computer-readable storage medium 806 may also include reporting instructions 856 configured for various functions, including, for example, reporting, to the network, an availability of the one or more measurements after the attempt is performed and reporting the at least one measurement to the network if the request for the at least one measurement is received from the network. For example, the reporting instructions 856 may be configured to implement one or more of the functions described below in relation to FIG. 9, including, e.g., blocks 908 and 912.

Figure 9:
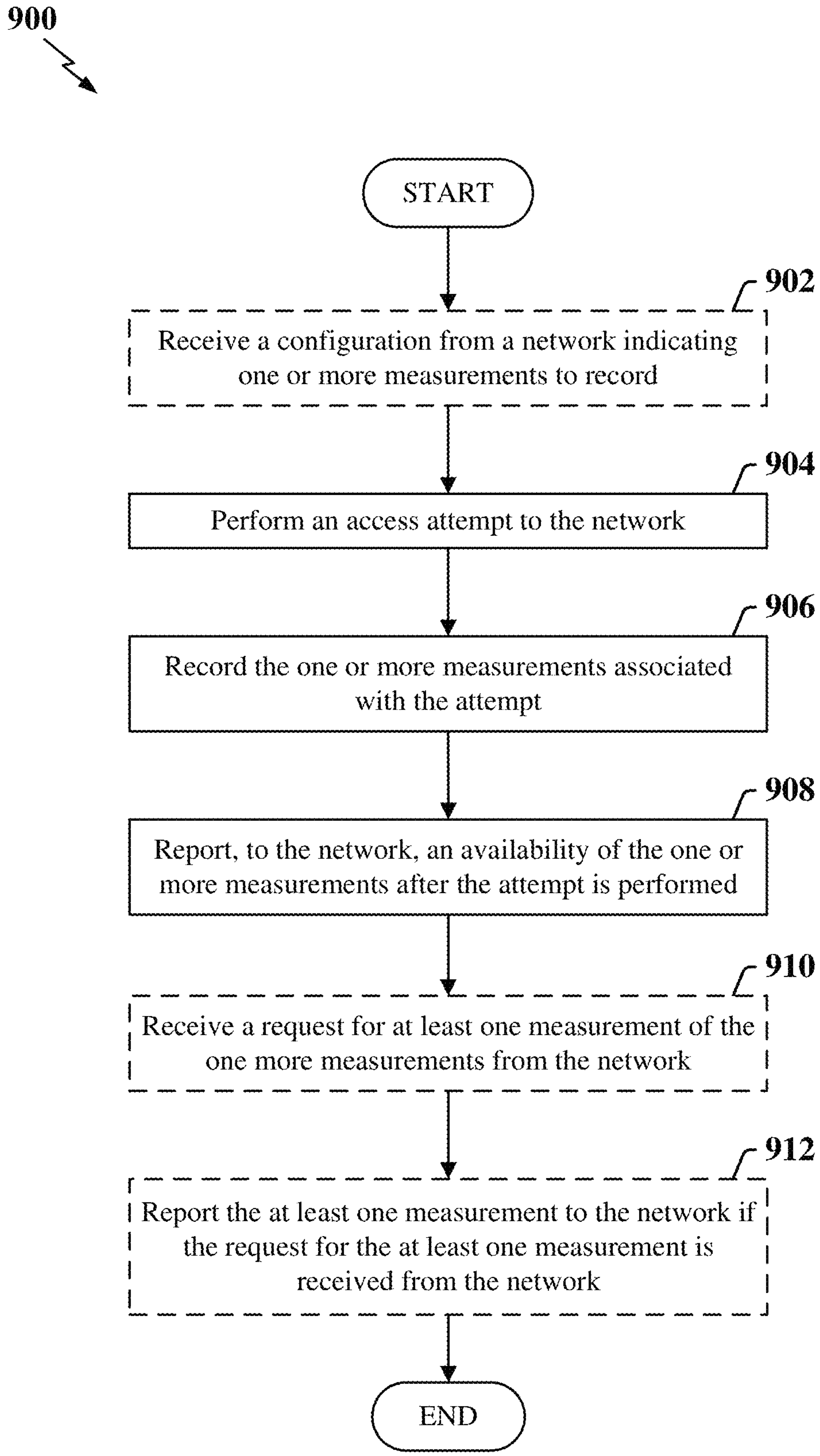
FIG. 9 is a flow chart illustrating an exemplary process for reporting control measurements (e.g., unified access control (UAC) measurements) to a network in accordance with some aspects of the present disclosure.

FIG. 9 is a flow chart illustrating an exemplary process 900 for reporting control measurements (e.g., unified access control (UAC) measurements) to a network in accordance with some aspects of the present disclosure. As described below, some or all illustrated features may be omitted in a particular implementation within the scope of the present disclosure, and some illustrated features may not be required for implementation of all aspects. In some examples, the process 900 may be carried out by the UE 800 illustrated in FIG. 8. In some examples, the process 900 may be carried out by any suitable apparatus or means for carrying out the functions or algorithm described below.

At block 902, the UE receives a configuration from a network indicating one or more measurements (e.g., UAC measurements) to record.

At block 904, the UE performs an attempt to access a network. At block 906, the UE records the one or more measurements associated with the attempt.

At block 908, the UE reports, to the network, an availability of the one or more measurements after the attempt is performed (e.g., after some predetermined time). In an aspect, the availability of the one or more measurements is reported via a radio resource control (RRC) setup message or a resume message (e.g., RRC resume complete message). In another aspect, the availability of the one or more measurements is reported while the UE is in a RRC connected state with the network. In a further aspect, while the UE is in the RRC connected state, the availability of the one or more measurements is reported via a new RRC message or a new indication in an existing RRC message.

At block 910, the UE receives, from the network, a request for at least one measurement of the one or more measurements. At block 912, the UE reports the at least one measurement to the network if the request for the at least one measurement is received from the network. In an aspect, the network utilizes the at least one measurement to better optimize wireless communication in a cell (e.g., increase/decrease capacity, provide more/less bandwidth, optimize channels, etc.).

In an aspect, the one or more measurements may include an access category, one or more identities used for the attempt, information indicating whether the attempt is initiated by a non-access stratum (NAS), information indicating a NAS procedure type, information indicating whether the attempt is initiated by a radio access network (RAN), and/or information indicating a RAN attempt type. The one or more measurements may further include information indicating whether access to the network is barred, an elapsed duration of an access timer (e.g., T390 timer) per access category, information indicating whether the access timer was running prior to the attempt, information indicating whether a reject timer (e.g., T302 timer) was running during the attempt, and/or information indicating whether the access timer or the reject timer stopped running due to a cell reselection. The one or measurements may further include unified access control (UAC) barring information applied for the attempt, a random number used for an access barring check, a resume or establishment cause for the attempt, a cell identifier, and/or a radio access technology implemented by the UE (e.g., NR or eLTE).

In one configuration, the UE 800 includes means for performing an attempt to access a network, means for recording one or more measurements associated with the attempt, means for reporting, to the network, an availability of the one or more measurements after the attempt is performed, means for reporting at least one measurement of the one or more measurements to the network if a request for the at least one measurement is received from the network, means for receiving a configuration from the network indicating the one or more measurements to record, and means for receiving the request for the at least one measurement from the network. In one aspect, the aforementioned means may be the processor(s) 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1, 2, and/or 8, and utilizing, for example, the processes and/or algorithms described herein in relation to FIG. 9.

Figure 10:
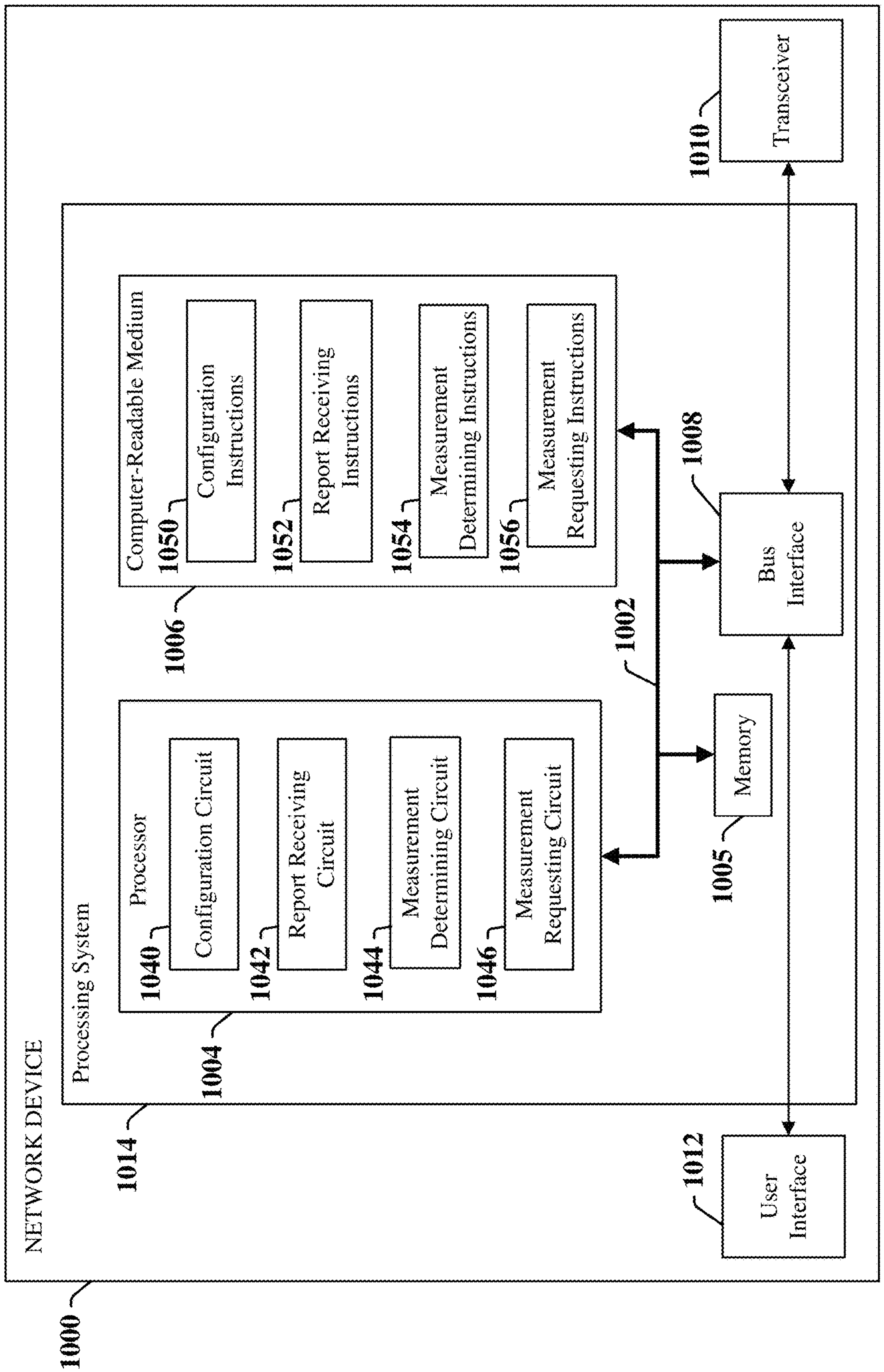
FIG. 10 is a block diagram illustrating an example of a hardware implementation for a network device employing a processing system in accordance with some aspects of the present disclosure.

FIG. 10 is a block diagram illustrating an example of a hardware implementation for a network device 1000 employing a processing system 1014. For example, the network device 1000 may be a base station or gNodeB as illustrated in any one or more of FIGS. 1 and/or 2. In accordance with various aspects of the disclosure, an element, or any portion of an element, or any combination of elements may be implemented with a processing system 1014 that includes one or more processors 1004.

The processing system 1014 may be substantially the same as the processing system 814 illustrated in FIG. 8, including a bus interface 1008, a bus 1002, memory 1005, a processor 1004, and a computer-readable medium 1006. Furthermore, the network device 1000 may include a user interface 1012 and a transceiver 1010 substantially similar to those described above in FIG. 8. That is, the processor 1004, as utilized in a network device 1000, may be used to implement any one or more of the processes described below and illustrated in FIG. 11.

In some aspects of the disclosure, the processor 1004 may include configuration circuitry 1040 configured for various functions, including, for example, sending a configuration to a UE indicating one or more measurements to record. For example, the configuration circuitry 1040 may be configured to implement one or more of the functions described below in relation to FIG. 11, including, e.g., block 1102. The processor 1004 may also include report receiving circuitry 1042 configured for various functions, including, for example, receiving, from the UE, a report indicating an availability of one or more measurements recorded by the UE in association with an attempt to access the network device and receiving, from the UE, a report including at least one measurement of the one or more measurements in response to the request. For example, the receiving circuitry 1042 may be configured to implement one or more of the functions described below in relation to FIG. 11, including, e.g., blocks 1104 and 1110. The processor 1004 may also include measurement determining circuitry 1044 configured for various functions, including, for example, determining to receive the at least one measurement of the one or more measurements. For example, the measurement determining circuitry 1044 may be configured to implement one or more of the functions described below in relation to FIG. 11, include, e.g., block 1106. The processor 1004 may also include measurement requesting circuitry 1046 configured for various functions, including, for example, sending, to the UE, a request to receive the at least one measurement. For example, the measurement requesting circuitry 1046 may be configured to implement one or more of the functions described below in relation to FIG. 11, include, e.g., block 1108.

Figure 11:
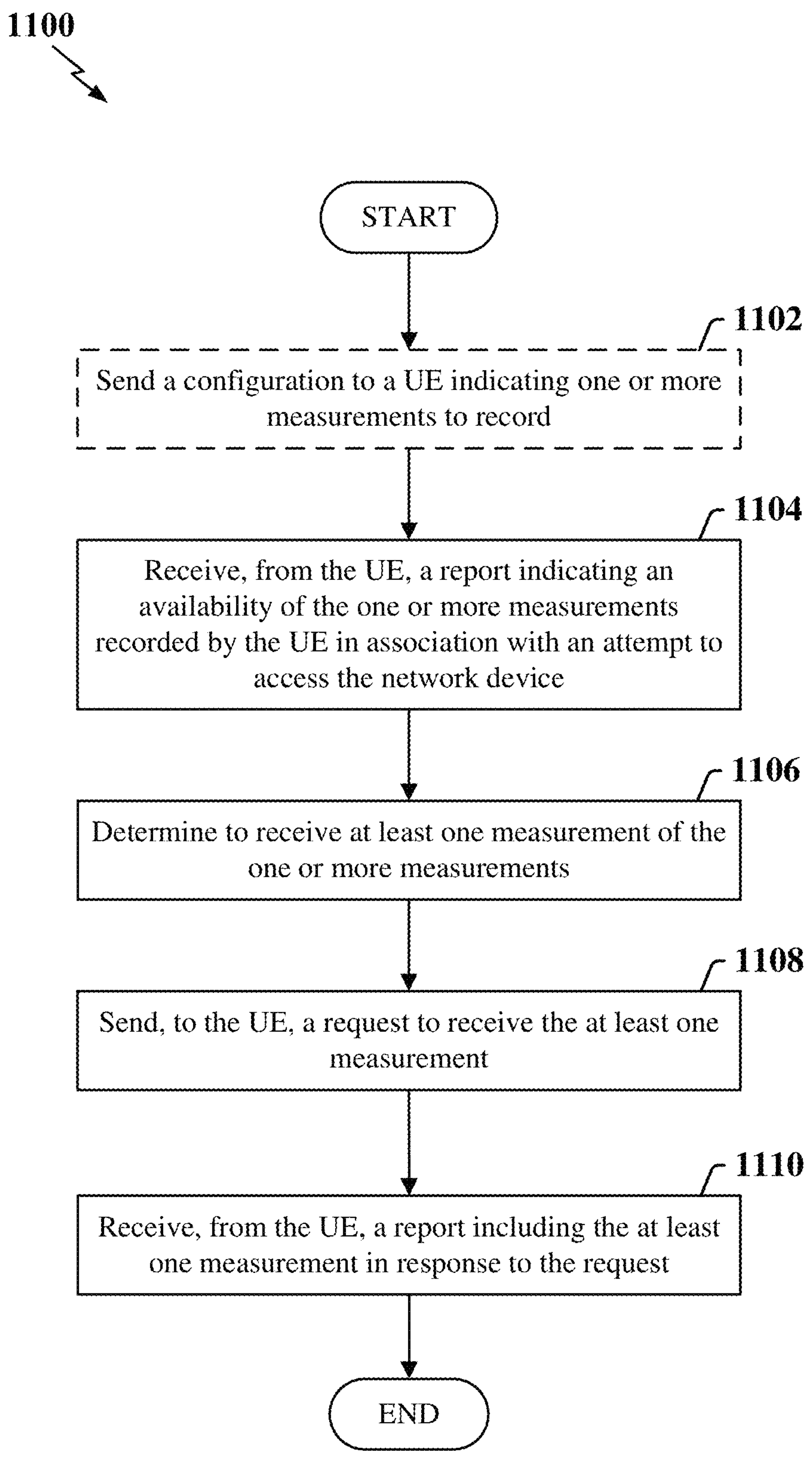
FIG. 11 is a flow chart illustrating an exemplary process for receiving a report of control measurements (e.g., unified access control (UAC) measurements) from a user equipment (UE) in accordance with some aspects of the present disclosure.

In one or more examples, the computer-readable storage medium 1006 may include configuration instructions 1050 configured for various functions, including, for example, sending a configuration to a UE indicating one or more measurements to record. For example, the configuration instructions 1050 may be configured to implement one or more of the functions described below in relation to FIG. 11, including, e.g., block 1102. The computer-readable storage medium 1006 may also include report receiving instructions 1052 configured for various functions, including, for example, receiving, from the UE, a report indicating an availability of one or more measurements recorded by the UE in association with an attempt to access the network device and receiving, from the UE, a report including at least one measurement of the one or more measurements in response to the request. For example, the receiving instructions 1052 may be configured to implement one or more of the functions described below in relation to FIG. 11, including, e.g., blocks 1104 and 1110. The computer-readable storage medium 1006 may also include measurement determining instructions 1054 configured for various functions, including, for example, determining to receive the at least one measurement of the one or more measurements. For example, the measurement determining instructions 1054 may be configured to implement one or more of the functions described below in relation to FIG. 11, include, e.g., block 1106. The computer-readable storage medium 1006 may also include measurement requesting instructions 1056 configured for various functions, including, for example, sending, to the UE, a request to receive the at least one measurement. For example, the measurement requesting instructions 1056 may be configured to implement one or more of the functions described below in relation to FIG. 11, include, e.g., block 1108, FIG. 11 is a flow chart illustrating an exemplary process 1100 for receiving a report of control measurements (e.g., unified access control (UAC) measurements) from a user equipment (UE) in accordance with some aspects of the present disclosure. As described below, some or all illustrated features may be omitted in a particular implementation within the scope of the present disclosure, and some illustrated features may not be required for implementation of all aspects. In some examples, the process 1100 may be carried out by the network device 1000 illustrated in FIG. 10. In some examples, the process 1100 may be carried out by any suitable apparatus or means for carrying out the functions or algorithm described below.

At block 1102, the network device sends a configuration to a UE indicating one or more measurements (e.g. UAC measurements) to record. At block 1104, the network device receives, from the UE, a report indicating an availability of one or more measurements recorded by the UE in association with an attempt to access the network device. In an aspect, the report indicating the availability of the one or more measurements is received via a radio resource control (RRC) setup message or a resume message (e.g., (e.g., RRC resume complete message). In another aspect, the report indicating the availability of the one or more measurements is received while the UE is in a RRC connected state with the network device. While the UE is in the RRC connected state, the report indicating the availability of the one or more measurements may be received via a new RRC message or a new indication in an existing RRC message.

At block 1106, the network device determines to receive at least one measurement of the one or more measurements. At block 1108, the network device sends, to the UE, a request to receive the at least one measurement. At block 1110, the network device receives, from the UE, a report including the at least one measurement in response to the request. In an aspect, the network device utilizes the at least one measurement to better optimize wireless communication in a cell (e.g., increase/decrease capacity, provide more/less bandwidth, optimize channels, etc.).

In an aspect, the one or more measurements may include an access category, one or more identities used for the attempt, information indicating whether the attempt is initiated by a non-access stratum (NAS), information indicating a NAS procedure type, information indicating whether the attempt is initiated by a radio access network (RAN), and/or information indicating a RAN attempt type. The one or more measurements may further include information indicating whether access to the network is barred, an elapsed duration of an access timer (e.g., T390 timer) per access category, information indicating whether the access timer was running prior to the attempt, information indicating whether a reject timer (e.g., T302 timer) was running during the attempt, and/or information indicating whether the access timer or the reject timer stopped running due to a cell reselection. The one or measurements may further include unified access control (UAC) barring information applied for the attempt, a random number used for an access barring check, a resume or establishment cause for the attempt, a cell identifier, and/or a radio access technology implemented by the UE (e.g., NR or eLTE).

In one configuration, the network device 1000 includes means for receiving, from a user equipment (UE), a report indicating an availability of one or more measurements recorded by the U E in association with an attempt to access the network device, means for determining to receive at least one measurement of the one or more measurements, means for sending, to the UE, a request to receive the at least one measurement, means for receiving, from the UE, a report including the at least one measurement in response to the request, and means for sending a configuration to the UE indicating the one or more measurements to record. In one aspect, the aforementioned means may be the processor(s) 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1, 2, and/or 8, and utilizing, for example, the processes and/or algorithms described herein in relation to FIG. 11.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method for wireless communication at a user equipment (UE), comprising:
- performing an attempt to access a network;
- recording one or more Unified Access Control (UAC)-related measurements associated with a number of UAC-related events occurring during the attempt;
- reporting an availability of the one or more UAC-related measurements after the attempt is performed; and
- reporting at least one measurement of the one or more UAC-related measurements if a request for the at least one measurement is received.

2. The method of claim 1, further comprising:
- receiving a configuration indicating the one or more UAC-related measurements to record.

3. The method of claim 1, wherein the availability of the one or more UAC-related measurements is reported via a radio resource control (RRC) setup message or a resume message.

4. The method of claim 1, wherein the availability of the one or more UAC-related measurements is reported while the UE is in a radio resource control (RRC) connected state with the network.

5. The method of claim 4, wherein the availability of the one or more UAC-related measurements is reported via a new RRC message or a new indication in an existing RRC message.

6. The method of claim 1, further comprising:
- receiving the request for the at least one measurement.

7. The method of claim 1, wherein the one or more UAC-related measurements further comprise at least one of:
- a type of application associated with the attempt;
- information indicating whether the attempt is initiated by a non-access stratum (NAS);
- information indicating a NAS procedure type;
- information indicating whether the attempt is initiated by a radio access network (RAN);
- information indicating a RAN attempt type;
- UAC barring information applied for the attempt;
- a random number associated with an access barring check; or
- a radio access technology.

8. The method of claim 1, wherein the one or more UAC-related measurements recorded by the UE indicate a type of the UE, and wherein the type of the UE comprises at least one of:
- a UE associated with firefighters;
- a UE associated with operators; or
- a UE associated with government entities.

9. A user equipment (UE) for wireless communication, comprising:
- one or more processors; and
- a memory coupled to the one or more processors, the one or more processors configured to cause the UE to:
  - perform an attempt to access a network;
  - record one or more Unified Access Control (UAC)-related measurements associated with a number of UAC-related events occurring during the attempt;
  - report an availability of the one or more UAC-related measurements after the attempt is performed; and
  - report at least one measurement of the one or more UAC-related measurements if a request for the at least one measurement is received.

10. The UE of claim 9, the one or more processors further configured to cause the UE to:
- receive a configuration that indicates the one or more UAC-related measurements to record.

11. The UE of claim 9, wherein the availability of the one or more UAC-related measurements is reported via a radio resource control (RRC) setup message or a resume message.

12. The UE of claim 9, wherein the availability of the one or more UAC-related measurements is reported while the UE is in a radio resource control (RRC) connected state with the network.

13. The UE of claim 12, wherein the availability of the one or more UAC-related measurements is reported via a new RRC message or a new indication in an existing RRC message.

14. The UE of claim 9, the one or more processors further configured to cause the UE to:

receive the request for the at least one measurement.

15. The UE of claim 9, wherein the one or more UAC-related measurements further comprise at least one of:

a type of application associated with the attempt;

information that indicates whether the attempt is initiated by a non-access stratum (NAS);

information that indicates a NAS procedure type;

information that indicates whether the attempt is initiated by a radio access network (RAN);

information that indicates a RAN attempt type;

UAC barring information applied for the attempt;

a random number associated with an access barring check; or a radio access technology.

16. A non-transitory computer-readable medium storing computer-executable code at a user equipment (UE), comprising code for causing a computer to:

perform an attempt to access a network;

record one or more Unified Access Control (UAC)-related measurements associated with a number of UAC-related events occurring during the attempt;

report an availability of the one or more UAC-related measurements after the attempt is performed; and report at least one measurement of the one or more UAC-related measurements if a request for the at least one measurement is received.

17. The non-transitory computer-readable medium of claim 16, wherein the code further causes the computer to:

receive a configuration indicating the one or more UAC-related measurements to record.

18. The non-transitory computer-readable medium of claim 16, wherein the code further causes the computer to:

receive the request for the at least one measurement.

19. The non-transitory computer-readable medium of claim 16, wherein the availability of the one or more UAC-related measurements is reported via a radio resource control (RRC) setup message or a resume message.

20. The non-transitory computer-readable medium of claim 16, wherein the availability of the one or more UAC-related measurements is reported while a user equipment (UE) is in a radio resource control (RRC) connected state with the network.

21. The non-transitory computer-readable medium of claim 20, wherein the availability of the one or more UAC-related measurements is reported via a new RRC message or a new indication in an existing RRC message.

22. The non-transitory computer-readable medium of claim 16, wherein the one or more UAC-related measurements further comprise at least one of:

a type of application associated with the attempt;

information indicating whether the attempt is initiated by a non-access stratum (NAS);

information indicating a NAS procedure type;

information indicating whether the attempt is initiated by a radio access network (RAN);

information indicating a RAN attempt type;

UAC barring information applied for the attempt;

a random number associated with an access barring check; or a radio access technology.

23. A method for wireless communication, comprising:

receiving a report indicating an availability of one or more Unified Access Control (UAC)-related measurements recorded in association with a number of UAC-related events occurring during an attempt to access a network device;

sending a request to receive at least one measurement of the one or more UAC-related measurements; and receiving a report including the at least one measurement in response to the request.

24. The method of claim 23, further comprising:

sending a configuration indicating the one or more UAC-related measurements to record.

25. The method of claim 23, wherein the report indicating the availability of the one or more UAC-related measurements is received via a radio resource control (RRC) setup message or a resume message.

26. The method of claim 23, wherein the report indicating the availability of the one or more UAC-related measurements is received while a user equipment (UE) is in a radio resource control (RRC) connected state with the network device.

27. The method of claim 26, wherein the report indicating the availability of the one or more UAC-related measurements is received via a new RRC message or a new indication in an existing RRC message.

28. The method of claim 23, wherein the one or more UAC-related measurements further comprise at least one of:

a type of application associated with the attempt;

information indicating whether the attempt is initiated by a non-access stratum (NAS);

information indicating a NAS procedure type;

information indicating whether the attempt is initiated by a radio access network (RAN);

information indicating a RAN attempt type;

UAC barring information applied for the attempt;

a random number associated with an access barring check; or a radio access technology.

29. A network device for wireless communication, comprising:

one or more processors; and a memory coupled to the one or more processors, the one or more processors configured to cause the network device to:

receive a report that indicates an availability of one or more Unified Access Control (UAC)-related measurements recorded in association with a number of UAC-related events occurring during an attempt to access the network device;

send a request to receive at least one measurement of the one or more UAC-related measurements; and receive a report that includes the at least one measurement in response to the request.

30. The network device of claim 29, the one or more processors further configured to cause the network device to:

send a configuration that indicates the one or more UAC-related measurements to record.

31. The network device of claim 29, wherein the report that indicates the availability of the one or more UAC-related measurements is received via a radio resource control (RRC) setup message or a resume message.

32. The network device of claim 29, wherein the report that indicates the availability of the one or more UAC-related measurements is received while a user equipment (UE) is in a radio resource control (RRC) connected state with the network device.

33. The network device of claim 32, wherein the report that indicates the availability of the one or more UAC-related measurements is received via a new RRC message or a new indication in an existing RRC message.

34. The network device of claim 29, wherein the one or more UAC-related measurements further comprise at least one of:

a type of application associated with the attempt;

information that indicates whether the attempt is initiated by a non-access stratum (NAS);

information that indicates a NAS procedure type;

information that indicates whether the attempt is initiated by a radio access network (RAN);

information that indicates a RAN attempt type;

UAC barring information applied for the attempt;

a random number associated with an access barring check; or a radio access technology.

35. A non-transitory computer-readable medium storing computer-executable code at a network device, comprising code for causing a computer to:

receive a report indicating an availability of one or more Unified Access Control (UAC)-related measurements recorded in association with a number of UAC-related events occurring during an attempt to access the network device;

send a request to receive at least one measurement of the one or more UAC-related measurements; and receive a report including the at least one measurement in response to the request.

* * * * *